United States Patent [19]

Ebner et al.

[11] 4,076,844

[45] Feb. 28, 1978

[54] TWO STAGE PROCESS FOR THE PRODUCTION OF VINEGAR WITH HIGH ACETIC ACID CONCENTRATION

[75] Inventors: Heinrich Ebner, Bonn-Ippendorf; Anton Enenkel, Bonn-Roettgen, both of Germany

[73] Assignee: Firma Heinrich Frings, Bonn, Germany

[21] Appl. No.: 643,297

[22] Filed: Dec. 22, 1975

[51] Int. Cl.² ............................................. C12J 1/04
[52] U.S. Cl. .................................. 426/17; 195/49; 195/115
[58] Field of Search .................. 195/47, 49, 79, 110, 195/112, 113, 115, 117, 118; 426/17

[56] References Cited

U.S. PATENT DOCUMENTS

| | | | |
|---|---|---|---|
| 2,997,424 | 8/1961 | Mayer | 195/49 |
| 3,252,870 | 5/1966 | Braun et al. | 195/49 |
| 3,445,245 | 5/1969 | Ebner | 426/17 |

OTHER PUBLICATIONS

Mori et al., IV. "Kinetic Studies on Submerged Acetic Acid Fermentation; Product Inhibition and Transient Adaptation of Cells to the Product", *Chemical Abstracts*, vol. 77, No. 19, p. 258, (1972), Abs. No. 124756k.
Mori et al., *J. Ferment. Technol.*, vol. 48, No. 4, (1970), pp. 203–212.
Ebner, *Ullmanns Encyklopaedie der Technischen Chemie*, 4th Ed., (1976), Band 11, pp. 41–55.
Hromatka et al., "Case History . . . Vinegar By Submerged Oxidative Fermentation", *Ind. Eng. Chem.*, vol. 51, No. 10 (1959), pp. 1279–1280.

*Primary Examiner*—Alvin E. Tanenholtz
*Assistant Examiner*—Thomas G. Wiseman
*Attorney, Agent, or Firm*—Norbert P. Holler

[57] ABSTRACT

A novel two-stage submerged fermentation process for producing vinegar with an acetic acid concentration of more than 15% is disclosed. In the first fermentation stage, the total concentration (i.e. the sum of the alcohol and acetic acid concentrations) increases from a starting level between 12 and 15% to a level above 15%, generally between 15 and 17%, but the acetic acid concentration is not permitted to exceed 15% while the alcohol concentration is maintained between about 1 to 5%, whereby both bacteria multiplication and acidification take place in the fermenting liquid. In the second fermentation stage, the total concentration is maintained constant but the acetic acid concentration is permitted to rise above 15% while the alcohol concentration drops almost to zero, whereby mainly acidification will occur while bacteria multiplication decreases and stops. The second stage is terminated when the desired acetic acid concentration above 15% is reached. In the basic embodiment of the process, the two fermentation stages are carried out in separate tanks. In another embodiment, an initial part of the first fermentation stage is carried out in a first tank and the final part of the first stage is then carried out in a second tank in which the second fermentation stage will ultimately also take place. This abstract is not to be taken either as a complete exposition or as a limitation of the present invention, however, the full nature and extent of the invention being discernible only by reference to and from the entire disclosure.

9 Claims, No Drawings

TWO STAGE PROCESS FOR THE PRODUCTION OF VINEGAR WITH HIGH ACETIC ACID CONCENTRATION

This invention relates to the art of producing vinegar with a high concentration of acetic acid, and more particularly to a process for the production, by submerged fermentation, of vinegar with an acetic acid concentration of more than 15%.

In the following specification and claims, without exception, the concentration of alcohol is expressed in volume by volume and the concentration of acetic acid in weight by volume. The sum of percent weight by volume of acetic acid and percent volume by volume of alcohol is called total concentration. As 1% volume by volume of alcohol is oxidized during the fermentation to almost exactly 1% weight by volume of acetic acid, the total concentration thus means the maximum acidity a mash to be fermented can theoretically reach.

At the present time, vinegar, especially that made of diluted alcohol, is used in very large quantities by canning factories. As a result, the sale of vinegar has become a very seasonal affair to an ever increasing degree. The vinegar industry produces vinegar all year round, however, and is, therefore, interested in achieving the highest possible acidity in order to save on storage space and freight costs.

On the side of the vinegar user, i.e. the canning industry, advantages accrue as well from an availability of very strong vinegar, because the brines can then be used two or three times before they have to be discarded. A prime example is the market in the United States, where vinegar with an acetic acid concentration of 20% and more is sold to canning factories. This vinegar is made by a freeze concentrating process in which vinegar of lower acidity is subjected to freezing. The ice so formed contains very little acid and is removed by centrifugation, leaving the desired higher acidity vinegar. This process, understandably, is quite expensive because it requires a large investment in machinery and entails high operating costs in the form of electrical energy and manpower.

The state of the art of submerged vinegar fermentation prior to this invention has been limited to production of vinegar with an acetic acid concentration of up to 15%. The process used to produce vinegar with an acidity above 12% and up to 15% is described in U.S. Pat. No. 3,445,245, and since that process constitutes the starting point for the present invention, as more fully described hereinafter, the entire disclosure of that patent is hereby incorporated in this application by reference.

In the aforesaid known process, the submerged vinegar fermentation starts from unfiltered and untreated vinegar having an alcohol content of 0.5–1.5% and an acetic acid concentration of 11.5–13%, which is mixed in a fermentation tank with such a quantity of mash containing 0–2% acetic acid and more than 11% alcohol than the contents of the tank attain a concentration of 7–9% acetic acid and more than 4% alcohol. To this mixture a specified amount of nutrients for the bacteria is added, the mixture is aerated, and the fermentation temperature is controlled to lie between 27° and 34° C. After some time, the acidification starts and proceeds until the alcohol concentration has decreased to 0.05–0.5%. At that point, such a quantity of vinegar is discharged from the fermentation tank and such a quantity of mash with nutrients is added at constant temperature and rapid mixing to the liquid remaining in the tank that the contents of the fermentation tank again attain a concentration of 7–9% acetic acid and more than 4% alcohol. This cyclical procedure is continued for as long as required, care being taken that the alcohol concentration never drops to 0.00% and that the total concentration of the contents of the fermentation tank does not vary during successive cycles by more than ± 0.3%.

The main characteristic of the above-described known process is, therefore, that the Acetobacter are subjected to a regular change in the acetic acid concentration and the alcohol concentration of their environment at a relatively constant total concentration within a single fermentation tank. Inasmuch as a certain number of bacteria are removed from the fermentation tank during each discharge, however, the remaining ones have to multiply and acidify during the following cycle. Stated in other words, multiplication and acidification have to go on simultaneously and without interruption. It is thus not surprising that there exists a maximum acidity which can be obtained by using this process, because the rate of multiplication of Acetobacter is dependent on the acetic acid concentration in the fermenting liquid. Within the range of 13–15% acetic acid concentration, multiplication slows down, and above 15% it stops while the Acetobacter still continue to acidify.

Now, although acidification above 15% is still possible, Acetobacter are damaged during this phase, to the extent that a subsequently undertaken reduction of the acetic acid concentration to values at which the Acetobacter readily multiply under the known conditions does not "reactivate" the bacteria. The fermentation thus stops and must be restarted anew, which procedure requires a great deal of time.

Recently, there has also become known a plural-tank process of producing vinegar, in which process the vinegar fermentation is carried out continuously in a number of stages, e.g. five, in a plurality of serially connected fermentation tanks, beginning with a total concentration of less than 8% in the first stage. In the second and subsequent stages, the fermentation proceeds under continuous addition of alcohol and an increasing total concentration, and the finished vinegar is continuously withdrawn from the last stage. The maximum possible acetic acid concentration in the last stage is 12%. As the fermenting liquid flows continuously from the first to the last stage, however, the alcohol content is slowly decreasing corresponding to the desired increase of the acetic acid concentration from the first to the last stage. In this process, therefore, the low total concentration of the first stage accelerates the multiplication of the bacteria, while within the following stages the multiplication slows down due to the increasing total concentration and acetic acid concentration. However, no distinctly different stages of multiplication and of acidification are provided in this process. Moreover, since the highest possible acidity which is reached with this process is 12%, the process provides no solution to the problem of producing vinegar with more than 15% acetic acid.

It is the fundamental objective of the present invention, therefore, to provide a novel and improved process of vinegar fermentation by which the hereinbefore set forth drawbacks and disadvantages of the known processes may be efficaciously avoided and the production of vinegar with a high acetic acid concentration of more than 15% in an economically attractive manner is rendered feasible.

Generally speaking, the objectives of the present invention are attained and vinegar with more than 15% acetic acid produced by a process in which, starting with a submerged vinegar fermentation carried out in the known manner, the fermentation thereafter takes place in two distinctly different stages, the first of which allows both a multiplication of the bacteria and acidification, and the second of which allows mainly acidification while bacteria multiplication decreases and stops. Accordingly, the first of the two fermentation stages is carried out at a total concentration increasing from between 12 and 15% to higher than 15% but at an acetic acid concentration of less than 15%, and the second of the two fermentation stages is carried out at a constant total concentration higher than 15% and at an acetic acid concentration in excess of 15%. In a manipulative sense, the fermentation in the second of the two fermentation stages is a batchwise operation that takes place separately in each of successive fractions (about 40%) of the fermenting liquid withdrawn (at prescribed points in time determined by the rising acetic acid concentration) from the first fermentation stage, while the fermentation in the first stage is a semi-continuous operation that takes place in whatever remains of the first stage fermenting liquid (after each withdrawal of a second stage fraction) plus whatever new material is added thereto to replenish the supply of first stage fermenting liquid and to bring the total concentration and the acetic acid concentration of the so newly formed mixture to the desired starting levels thereof. As a practical matter, the process is carried out in more than one fermentation tank, with each withdrawn fraction of the fermenting liquid of the first fermentation tank being transferred from the first fermentation tank into another fermentation tank during the first fermentation stage and without any disturbance or interruption of the fermentation in either tank. The withdrawal and replenishing procedures of the process may be repeated as often as required.

In a particular variant of this process according to one embodiment of the present invention, (a) a submerged vinegar fermentation of the known type is started in one fermentation tank;
(b) during the fermentation started as mentioned above, ethyl alcohol with a concentration of 30–100% is added to the fermenting liquid in such a quantity and at such a rate that an alcohol concentration of 1–5% is established and maintained in the fermenting liquid;
(c) when the acetic acid concentration in the fermenting liquid reaches 13–15%, the addition of alcohol is stopped and a desired fraction, about 20–50% of said liquid, is discharged into a second fermentation tank;
(d) the procedure of discharging fermenting liquid from the first fermentation tank into the second fermentation tank is effected without interrupting the fermentation in the liquid remaining in the first fermentation tank and without interrupting the fermentation in the fermenting liquid being discharged into the second fermentation tank;
(e) the first fermentation tank is then re-supplied, under constant temperature and rapid mixing, with a quantity of mash which contains 2.5–10% alcohol, 1–6% acetic acid, and per 1000 liters 1–3 kg nutrients for the bacteria, and which is sufficient to impart to the newly formed mixture a 7–10% acetic acid concentration and a 12–15% total concentration;
(f) the acidification of the fermenting liquid fraction which has been transferred into the second fermentation tank is completed under constant aeration and temperature control, until a 0–0.4% alcohol concentration and a concentration of more than 15% acetic acid have been reached;
(g) at this point the finished vinegar is removed from the second fermentation tank;
(h) the aforesaid steps (b), (c), (d) and (e) (the addition of alcohol to the fermenting liquid in said first fermentation tank, the discharging of fermenting liquid from the first fermentation tank into the second fermentation tank without any interruption of the fermentation, and the refilling of the first fermentation tank with mash) are repeated as often as required; and
(i) the aforesaid steps (f) and (g) (the completion of the acidification of the discharged fermenting liquid in the second fermentation tank and the emptying of the second fermentation tank) are also repeated as often as required.

It will be seen, therefore, that in this variant of the process, the first fermentation stage, involving both multiplication of bacteria and acidification, takes place in the first fermentation tank, and that the second fermentation stage, where the main aim is to acidify while bacteria multiplication slows down and ultimately stops, takes place in the second fermentation tank. At the end of the second fermentation stage, the Acetobacter have completely lost the ability to multiply and are removed from the process together with the finished vinegar.

Another variant of the process according to the present invention is possible, if the first fermentation tank is operated in general in the known manner while in a second fermentation tank an initial stage of acidification and multiplication is carried out followed by a stage of mainly acidification. In this variant, however, the time interval required to carry out the stages in the second fermentation tank is about the double of the cycle time in the first fermentation tank. A third fermentation tank must, therefore, be provided for alternate use. In this variant of the process, the Acetobacter in both the second and third fermentation tanks are ultimately removed from the process with the finished vinegar.

More particularly, in this variant of the process, the procedure will be as follows:

(a) a submerged vinegar fermentation is started in the first fermentation tank in the known manner;
(b) whenever the fermenting liquid in the first fermentation tank has reached an acetic acid concentration of 12–15% and an alcohol concentration of 0.05–3%, such a quantity of fermenting liquid is discharged from the first fermentation tank into one or the other of the second and third fermentation tanks (with successive discharges alternating between the second and third tanks) that the replenishing of the fermenting liquid in the first fermentation tank, under constant temperature and rapid mixing, with a mash having a 0–2% acetic acid concentration and more than 11% alcohol and containing per 1000 liters 1–3 kg nutrients for the bacteria, leads to the reestablishment in the first fermentation tank, for the next fermentation cycle, of a starting acetic acid concentration of 7-10% and a total concentration of 12-15%;

(c) the discharges into the second and third fermentation tanks must be effected without interrupting the fermentation of the fermenting liquid remaining in said first fermentation tank and without interrupting the fermentation in the fermenting liquid fractions being discharged into the second and third fermentation tanks;

(d) immediately after a discharge of fermenting liquid into either the second or the third fermentation tank is completed, there is added to the contents of that one of the second and third fermentation tanks, under constant temperature and rapid mixing, such a quantity of a mash having a 0-2% acetic acid concentration and more than 11% alcohol and containing per 1000 liters 1-3 kg nutrients for the bacteria, that the fermenting liquid in the respective second or third fermentation tank reaches a 7-10% acetic acid concentration and a total concentration of 12-15%;

(e) thereafter there is added to the contents of the respective one of the second and third fermentation tanks, such a quantity of alcohol with a concentration of 30-100% and at such a rate that an alcohol concentration of 1-5% is maintained in the fermenting liquid in that tank;

(f) this addition of alcohol into the second or third fermentation tank is stopped when the acetic acid concentration of the fermenting liquid in that tank has reached more than 13% but less than 15%, and the acidification of the fermenting liquid in that tank is then completed, under constant aeration and temperature control, until the alcohol concentration has been reduced to 0-0.4% and the acetic acid concentration has increased to above 15%;

(g) at this point, the finished vinegar is removed from the respective one of the second and third fermentation tanks;

(h) the aforesaid steps (b) and (c) (the discharging of fermenting liquid in an alternating sequence from the first fermentation tank into the second and third fermentation tanks without any interruption of the fermentation in any of the tanks and the refilling of the first fermentation tank) are repeated as often as required; and (i) the aforesaid steps (d), (e), (f) and (g) (the addition of mash and alcohol to the contents of the second and third fermentation tanks, the stopping of the addition of alcohol, the completion of the acidification, and the alternating removal of the finished vinegar from the second and third fermentation tanks) are repeated as often as required.

It is understood that those operating conditions which are necessary to achieve and to maintain a vinegar fermentation, which conditions are well known to those skilled in the art and thus should not have to be mentioned here, must be kept within the known limits. For example, the fermentation temperature has to remain between 27° and 34° C.; the aeration has to reach every part of the fermenting volume without interruption and has to be in the range of 0.05-0.07 volume of air per volume of liquid per minute; etc. For further details of these and other conditions and of the nature of the Acetobacter strain and the nutrients, reference should be had to U.S. Pat. No. 3,445,245.

A further understanding of the process according to the present invention may be had from the following examples.

EXAMPLE A

A first fermentation tank having a total volume of 24000 liters was filled with 12000 liters of unfiltered and untreated vinegar having an alcohol content of 1% and an acetic acid concentration of 12.5%, with 6000 liters of mash containing 1% acetic acid and 13% alcohol, and with 27 kg of nutrients. The mixture thus obtained, having an acetic acid concentration of 8.67% and an alcohol content of 5.0%, was aerated and kept at a constant temperature of 30° C. After the fermentation had started and the fermenting liquid had reached a concentration of 10% acetic acid and of 3.5% alcohol, the addition of ethyl alcohol with a concentration of 80% was begun (time zero), and the rate of alcohol flow was adjusted in such a manner that the alcohol concentration of the fermenting liquid (as determined by conventional monitoring techniques) remained within the range of 3.0-4.0%. 28 hours later (time 28 hrs), through the addition of 950 liters of 80% alcohol, the fermenting liquid was found to have reached an acetic acid concentration of 13% and an alcohol concentration of 3.8%.

At that point, the addition of alcohol was stopped and 7600 liters of the fermenting liquid (approximately 40% of the contents of the first fermentation tank) were transferred, without any interruption of the fermentation, into a second fermentation tank having a total volume of 12000 liters. To the first fermentation tank, 6650 liters of mash having an acetic acid concentration of 0.83% and an alcohol concentration of 7.3% were then added slowly together with 11.5 kg of nutrients and under rapid mixing, to arrive at new starting concentrations of 8.5% acetic acid and 5.1% alcohol. In the second fermentation tank, the transferred fermenting liquid was aerated and kept at the specified constant fermentation temperature (30° C), and within 36 hours (time 64 hrs) this fermenting liquid was found to have reached an acetic acid concentration of 16.4% and a residual alcohol concentration of 0.2%. This strong vinegar was thereupon discharged from the second fermentation tank, rendering the latter ready for the next transfer.

Reverting now to the first fermentation tank, 14 hours after the first discharge and the associated refill (time 42 hrs), the addition of alcohol to the contents of the first fermentation tank was resumed, and 28 hours thereafter (time 70 hrs) 7600 liters of the fermenting liquid, which by then had again reached a concentration of 13% acetic acid and 3.8% alcohol, were transferred into the second fermentation tank where, under continuous aeration and constant temperature, the acidification was found to have become completed 36 hours later (time 106 hrs) to provide a finished vinegar with a concentration of 16.4% acetic acid and 0.2% alcohol.

The foregoing cyclical sequence of operations is, of course, continued for as long as desired and will have to be interrupted only when the production run is ended.

To summarize the example, therefore, in the first fermentation tank the fermentation is carried out in a manner best described as semi-continuous, with cycles immediately following each other, at a total concentration varying between 13 and 17%, but with an acetic acid concentration of up to 13%, so as to achieve both bacteria multiplication and acidification (first stage of fermentation). In the second fermentation tank, on the other hand, the fermentation is carried out in a manner best described as batchwise, with the individual quantities of the fermenting liquid which are taken over from the first fermentation tank being in full fermentation rate over 42-hour intervals, at a total concentration in excess of 15% but with an acetic acid concentration of more than 13%, so as to bring about ultimately a ceasing of bacteria multiplication and the continuance of mainly acidification (second stage of fermentation), until, after completion of the acidification, this tank is emptied with the finished vinegar having an acetic acid concentration of more than 15% (about 16.4% as shown) and about 0.2% alcohol.

On an average, the production figure amounts to 676 kg acetic acid in 24 hours, and the yield based on alcohol is 96%.

EXAMPLE B

A first fermentation tank having a total volume of 24000 liters was filled with 12000 liters of unfiltered and untreated vinegar having an alcohol concentration of 1% and an acetic acid concentration of 12.5%, with 6000 liters of mash containing 1% acetic acid and 13% alcohol, and with 27 kg of nutrients. The mixture thus obtained, having an acetic acid concentration of 8.67% and an alcohol concentration of 5.0%, was aerated and kept at a constant temperature of 28° C. After the fermentation had started and after the fermenting liquid had reached a concentration of 12.5% acetic acid and 1% alcohol, reaching the end of an initial part of the first fermentation stage, 6000 liters were discharged, without any interruption of the fermentation, into a second fermentation tank having a total volume of 12000 liters (time zero). To the remaining contents of the first fermentation tank, there were added, under constant temperature and rapid mixing, 6000 liters of mash having the above concentration of acetic acid (1%) and alcohol (13%) and 9 kg of nutrients, whereupon the initial part of the first fermentation stage continued in the soreplenished fermenting liquid.

To the contents of the second fermentation tank, 3000 liters of mash again having the same concentration of acetic acid (1%) and alcohol (13%) were added together with 4.5 kg of nutrients under constant temperature (28° C) and rapid mixing. After 9 hours (time 9 hrs), the acetic acid concentration of the fermenting liquid in the second fermentation tank was 9.3% and the alcohol concentration was 4.3%. At this point, the addition of alcohol with a concentration of 80% was started at such a rate that the alcohol concentration in the fermenting liquid stayed between 3.5 and 4.5%. 24 Hours later (time 33 hrs), a total of 500 liters of 80% alcohol had been added to the second fermentation tank, and the acetic acid concentration of the fermenting liquid had reached 13% and the alcohol concentration 3.8%. The addition of alcohol to the second fermentation tank was now stopped, bringing to an end the final part of the first fermentation stage in this tank, and the fermentation permitted to proceed to completion during the second fermentation stage, with the fermenting liquid being maintained at constant temperature (28° C) and under constant aeration. Another 24 hours later (time 57 hrs), the fermenting liquid in the second fermentation tank had attained a concentration of 16.5% acetic acid and 0.3% alcohol. The total volume of 9500 liters was then discharged from the second fermentation tank into a receiver for the finished vinegar.

Reverting now to the fermentation in the first fermentation tank, 29 hours after the first discharge and refilling operations (time 29 hrs), the fermenting liquid in the first tank again reached a concentration of 12.5% acetic acid and 1% alcohol. At this point, 6000 liters of the fermenting liquid were discharged into a third fermentation tank (again without any disturbance of the fermentation in either tank) having a total volume of 12000 liters. To the remaining contents of the first fermentation tank, 6000 liters of mash having the above concentration of acetic acid (1%) and alcohol (13%) were then added together with 9 kg of nutrients under constant temperature and rapid mixing, and the initial part of the first stage of the fermentation again continued.

To the contents of the third fermentation tank, 3000 liters of mash with the above described concentration of acetic acid (1%) and alcohol (13%) were added together with 4.5 kg of nutrients under constant temperature (28° C) and rapid mixing. 9 hours later (time 38 hrs), the acetic acid concentration of the fermenting liquid in the third fermentation tank was 9.3% and the alcohol concentration was 4.3%. At this time, the addition of alcohol with a concentration of 80% was started at such a rate that the alcohol concentration in the fermenting liquid in the third fermentation tank stayed between 3.5 and 4.5%. 24 Hours later (time 62 hrs), a total of 500 liters of 80% alcohol had been added to the third fermentation tank, and the acetic acid concentration had reached 13% and the alcohol concentration 3.8%. The addition of alcohol to the third fermentation tank was then stopped, bringing to an end the final part of the first fermentation stage in this tank, and the fermentation permitted to proceed to completion during the second fermentation stage, with the fermenting liquid being maintained at constant temperature and under constant aeration. Another 24 hours later (time 86 hrs), the fermenting liquid in the third fermentation tank had attained a concentration of 16.5% acetic acid and 0.3% alcohol. The total volume of 9500 liters was then discharged from the third tank into a receiver for the finished vinegar.

In the meantime, 29 hours after the second discharge and refill of the first fermentation tank (time 58 hrs), 6000 liters of the first stage fermenting liquid were again discharged from the first fermentation tank but into the second fermentation tank, and yet another 29 hours later (time 87 hrs) again 6000 liters from the replenished first fermentation tank were discharged but now into the third fermentation tank. This sequence was thereafter alternatingly continued, as well, of course, as the procedures of adding mash and alcohol to the second and third fermentation tanks, of completing the fermentations in these tanks, and of emptying them preparatory to the intake of the respective new batches from the first fermentation tank.

To summarize Example B, therefore, in the first fermentation tank the initial part of the first fermentation stage is carried out in a manner which again is best described as semicontinuous, at a constant total concentration between 12 and 15% and at an acetic acid concentration of between 12 and 15%, with cycles immediately following each other as respective batches of the first stage fermenting liquid are alternatingly discharged into the second and third fermentation tanks. Bacteria multiplication and acidification characterize the first stage of fermentation.

In each of the second and third fermentation tanks, the fermentation is carried out in a manner which again is best described as batchwise, first under conditions of a constant total concentration as in the first fermentation tank, followed by conditions of a constant alcohol and an increasing total concentration with a rising acetic acid concentration of up to between 13 and 15%, and second under conditions of completion of the fermentation at this high (about 16.8%) total concentration with an acetic acid concentration now rising above 15%. Bacteria multiplication and acidification thus characterize the first part of the fermentation in these tanks, lasting until the addition of alcohol is stopped and constituting the final part of the first fermentation stage, while the second part of the fermentation in these tanks, following the stopping of the alcohol addition and characterized by mainly acidification as the fermentation proceeds to completion, constitutes the second fermentation stage.

The second and the third fermentation tanks, as stated, are alternatingly emptied at intervals of 29 hours. Thus, 9500 liters of vinegar with 16.5% acetic acid and 0.3% alcohol are delivered every 29 hours, the overall production being 1223 kg of acetic acid per 24 hours. The yield based on alcohol is 96%.

It will be understood that the foregoing description of preferred embodiments of the present invention is for purposes of illustration only, and that the various herein disclosed operational conditions and features and the ranges and proportions of materials used are susceptible to a number of modifications and changes none of which entails any departure from the spirit and scope of the present invention as defined in the hereto appended claims. Merely by way of example, it would be possible to alternatingly withdraw batches of the fermenting liquid from the first fermentation tank into a second fermentation tank and into a receiver for finished vinegar, the receiver being provided in lieu of a third fermentation tank. In this case, therefore, high strength vinegar with more than 15% (e.g. 16.5%) acetic acid is produced in the second fermentation tank, while the receiver will contain vinegar with, for example, only 13% acetic acid, i.e. the output of the first fermentation tank (in Example B, the 13% acetic acid concentration would be reached if the discharge time were chosen a few hours later than as described). This may be desirable if, for other purposes, some amounts of vinegar with 13% (or less) acidity are needed at the same time as the high acidity vinegar.

What we claim is:

1. A two-stage submerged fermentation process for the production of vinegar with an acetic acid concentration of more than 15%, wherein
    1. the first fermentation stage is characterized by
        A. a total concentration, defined as the sum of the alcohol concentration expressed in percent volume by volume and the acetic acid concentration expressed in percent weight by volume, which
            i. is at substantially a starting level of between 12 and 15% thereof during an initial part of said first fermentation stage,
            ii. increases from said starting level thereof to above 15% during a middle part of said first fermentation stage, and
            iii. is continuously above 15% and substantially constant during a final part of said first fermentation stage, and
        B. an acetic acid concentration which increases from the starting level thereof but does not exceed 15% during the entire first fermentation stage,
        and insures both multiplication of bacteria and acidification, and
    2. the second fermentation stage is characterized by
        A. said total concentration which is above 15% and substantially constant and
        B. an acetic acid concentration which is above 15% and permits acidification to continue while multiplication of bacteria ceases;
    said process comprising:
    a. starting a submerged vinegar fermentation and thereby starting said initial part of said first fermentation stage by aerating, at substantially constant temperature between 27° and 34° C, a mixture of materials, constituting the fermenting liquid, which includes acetic acid, alcohol, bacteria (Acetobacter), and nutrients for the bacteria and which is characterized by a starting level of the acetic acid concentration, expressed in percent weight by volume, between 7 and 10% and by the said starting level of the total concentration between 12 and 15%;
    b. adding to the fermenting liquid, for effecting said middle part of said first fermentation stage, a 30-100% solution of ethyl alcohol in a quantity and at a rate sufficient to effect the increase of the total concentration to above 15%;
    c. dividing the fermenting liquid into a transferred and a remaining portion during said first fermentation stage;
    d. bringing the acetic acid concentration of said remaining portion of the fermenting liquid back to the starting level thereof, and subjecting said remaining portion further to at least the initial part of said first fermentation stage at a total concentration of substantially said starting level thereof;
    e. subjecting said transferred portion of the fermenting liquid to at least said second fermentation stage by aerating it under substantially constant temperature of between 27° and 34° C without further addition of alcohol until the alcohol concentration decreases to substantially zero; and
    f. terminating the fermentation of said transferred portion of the fermenting liquid when the alcohol concentration therein has decreased to substantially zero.

2. The process of claim 1, wherein the division of the fermenting liquid is carried out during said final part of said first fermentation stage when the acetic acid concentration reaches the range between 13 and 15%.

3. The process of claim 2 wherein
    a. said initial and middle parts of said first fermentation stage are carried out in a first fermentation tank;
    b. the addition of alcohol is made in a quantity and at a rate sufficient to maintain the alcohol concentration in the fermenting liquid in said first fermentation tank between about 1 and 5% while the total concentration increases to a level above 15%;
    c. the division of the fermenting liquid is carried out by transferring a 20-50% portion thereof from said first fermentation tank to a second fermentation tank;

d. said remaining portion of the fermenting liquid in said first fermentation tank is replenished with sufficient quantities of a mixture with relatively low total concentration containing between about 2.5 and 10% alcohol, between about 1 and 6% acetic acid, and per 1000 liters between about 1 and 3 kg nutrients for the bacteria, to bring the total concentration and the acetic acid concentration back to substantially said starting levels thereof;

e. said replenished remaining portion of the fermenting liquid in said first fermentation tank is again subjected to said initial, middle and final parts of said first fermentation stage;

f. said transferred portion of the fermenting liquid in said second fermentation tank is there aerated and subjected to said second fermentation stage;

g. the finished vinegar is withdrawn from said second fermentation tank at the end of said second fermentation stage; and h. the steps of alcohol addition to the fermenting liquid in said first fermentation tank during said middle part of said first fermentation stage, transfer of a portion of the fermenting liquid from said first to said second fermentation tank during said final part of said first fermentation stage, replenishing the remaining portion of the fermenting liquid in said first fermentation tank with a low total concentration mixture for continuation with the initial, middle and final parts of the first fermentation stage, aerating said transferred portion and subjecting it to the second fermentation stage in said second fermentation tank, and withdrawal of the finished vinegar from said second fermentation tank at the end of the second fermentation stage, are repeated as frequently as required.

4. The process of claim 3, wherein during said middle part of said first fermentation stage in said first fermentation tank the total concentration increases to a level between 15 and 17%.

5. The process of claim 1, wherein the division of the fermenting liquid is carried out during said initial part of said first fermentation stage when the acetic acid concentration reaches the range between 12 and 15%.

6. The process of claim 5, wherein
a. said initial part of said first fermentation stage is carried out in a first fermentation tank;
b. the division of the fermenting liquid is carried out by transferring a 20–50% portion thereof from said first fermentation tank to a second fermentation tank;
c. said remaining portion of the fermenting liquid in said first fermentation tank is replenished with sufficient quantities of a mash containing more than 11% alcohol, between about 0–2% acetic acid and per 1000 liters about 1–3 kg nutrients for the bacteria and having a total concentration of substantially said starting level to bring the acetic acid concentration of said replenished remaining portion of the fermenting liquid back to substantially said starting level and to continue to subject said replenished remaining portion to an initial part of said first fermentation stage;
d. said transferred portion of the fermenting liquid is replenished in said second fermentation tank by sufficient quantities of said mash to likewise bring the acetic acid concentration back to substantially said starting level thereof;

e. said replenished transferred portion of the fermenting liquid in said second fermentation tank is there subjected (i) first to said middle part of said first fermentation stage including the addition of alcohol in a quantity and at a rate sufficient to maintain the alcohol concentration between about 1 and 5% while the total concentration increases to a level above 15%, (ii) second to said final part of said first fermentation stage with the acetic acid concentration reaching the range between 13 and 15%, and (iii) third to said second fermentation stage with the acetic acid concentration exceeding 15% and the alcohol concentration decreasing to substantially zero;

f. the finished vinegar is withdrawn from said second fermentation tank at the end of said second fermentation stage; and g. the steps of transferring fermenting liquid from said first to said second fermentation tank, replenishing the remaining portion of the fermenting liquid in said first fermentation tank and continuing to subject said replenished remaining portion to an initial part of said first fermentation stage, replenishing said transferred portion in said second fermentation tank, alcohol addition to the fermenting liquid in said second fermentation tank during said middle part of said first fermentation stage, subjecting the fermenting liquid in said second fermentation tank to said final part of said first fermentation stage and to said second fermentation stage, and withdrawal of the finished vinegar from said second fermentation tank at the end of said second fermentation stage, are repeated as frequently as required.

7. The process of claim 6, wherein during said middle part of said first fermentation stage in said second fermentation tank the total concentration therein increases to a level between 15 and 17%.

8. The process of claim 6, wherein
a. the division of the fermenting liquid is carried out by transferring successive 20–50% portions of the starting fermenting liquid and subsequently replenished remaining portions thereof from said first fermentation tank in an alternating sequence to one and another second fermentation tank;
b. said transferred portions of the fermenting liquid in said one and said other second fermentation tank are there subjected each to said middle and final parts of said first fermentation stage and to said second fermentation stage;
c. the finished vinegar is withdrawn alternately from said one and said other second fermentation tank at the end of the respective second fermentation stage therein; and
d. the steps of transferring fermenting liquid from said first to said one second fermentation tank, replenishing the remaining portion of the fermenting liquid in said first fermentation tank and continuing to subject said replenished remaining portion to an initial part of said first fermentation stage, replenishing said transferred portion in said one second fermentation tank, alcohol addition to the fermenting liquid in said one second fermentation tank during said middle part of said first fermentation stage therein, said final part of said first fermentation stage and said second fermentation stage in said one second fermentation tank, withdrawal of the finished vinegar from said one second fermentation tank at the end of said second fermentation stage therein, transferring fermenting liquid from said first to said other second fermentation tank, again replenishing the remaining portion of the fermenting liquid in said first fermentation tank and continuing to subject said again replenished remaining portion to an initial part of said first fermentation stage, replenishing said last-named transferred portion in said other second fermentation tank, alcohol addition to the fermenting liquid in said other second fermentation tank during said middle part of said first fermentation stage therein, said final part of said first fermentation stage and said second fermentation stage in said other second fermentation tank, and withdrawal of the finished vinegar from said other second fermentation tank at the end of said second fermentation stage therein, are repeated as frequently as required.

9. The process of claim 8, wherein during said middle part of each of said first fermentation stages in said one and said other second fermentation tank the respective total concentration therein increases to a level between 15 and 17%.

* * * * *

UNITED STATES PATENT AND TRADEMARK OFFICE
CERTIFICATE OF CORRECTION

PATENT NO. : 4,076,844
DATED : February 28, 1978
INVENTOR(S) : Heinrich Ebner et al.

It is certified that error appears in the above-identified patent and that said Letters Patent are hereby corrected as shown below:

Column 1, line 60, for "than" read --that--.

Signed and Sealed this

Twentieth Day of June 1978

[SEAL]

Attest:

RUTH C. MASON
Attesting Officer

DONALD W. BANNER
Commissioner of Patents and Trademarks